United States Patent
Quick, Jr. et al.

(10) Patent No.: US 7,873,163 B2
(45) Date of Patent: Jan. 18, 2011

(54) METHOD AND APPARATUS FOR MESSAGE INTEGRITY IN A CDMA COMMUNICATION SYSTEM

(75) Inventors: Roy Franklin Quick, Jr., San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 935 days.

(21) Appl. No.: 10/011,964

(22) Filed: Nov. 5, 2001

(65) Prior Publication Data

US 2003/0088769 A1    May 8, 2003

(51) Int. Cl.
  *H04K 1/00*  (2006.01)
  *H04L 9/00*  (2006.01)
(52) U.S. Cl. ................ 380/247; 380/44; 380/45; 380/249; 380/259; 380/260; 380/270; 380/273
(58) Field of Classification Search ............ 380/247, 380/45, 44
  See application file for complete search history.

(56) References Cited

U.S. PATENT DOCUMENTS

| | | | |
|---|---|---|---|
| 5,309,501 A * | 5/1994 | Kozik et al. | 455/410 |
| 5,778,075 A | 7/1998 | Haartsen | |
| 6,154,541 A * | 11/2000 | Zhang | 380/28 |
| 6,603,755 B1 * | 8/2003 | Parker | 370/342 |
| 6,671,507 B1 | 12/2003 | Vinck | |
| 6,853,729 B1 * | 2/2005 | Mizikovsky | 380/249 |
| 2002/0091933 A1 | 7/2002 | Quick, Jr. et al. | |
| 2002/0146127 A1 | 10/2002 | Wong | |

| | | | |
|---|---|---|---|
| 2003/0169725 A1 * | 9/2003 | Ahmavaara et al. | 370/352 |

FOREIGN PATENT DOCUMENTS

| | | |
|---|---|---|
| EP | 1156694 A1 | 11/2001 |
| KR | 20010102406 | 11/2001 |
| KR | 100864077 | 10/2008 |

(Continued)

OTHER PUBLICATIONS

Bruce Schneier, Applied Cryptography, 1996, John Wiley & Sons, Inc., Second Edition, pp. 270-271.*

(Continued)

*Primary Examiner*—Benjamin E Lanier
(74) *Attorney, Agent, or Firm*—Sayed Hossain Beladi; Won Tae C Kim (57) ABSTRACT

In a communication system (100), a method and apparatus provides for message integrity regardless of the operating version of an authentication center (198) or an interface (197) between the authentication center (198) and a mobile switching center (199). The method and apparatus include generating a cellular message encryption algorithm (CMEA) key, and generating a CMEA-key-derived integrity key (CIK) based on the CMEA key for message integrity between a mobile station and a base station. The mobile station transmits a registration message to the base station, and determines an operating version of the authentication center (198) in communication with the base station based on whether the mobile station receives a registration accepted order or some elements of an authentication vector from the base station. The CIK is generated based on the CMEA key, if the mobile station receives a valid registration accepted order from the base station.

20 Claims, 6 Drawing Sheets

FOREIGN PATENT DOCUMENTS

| WO | 9903246 | 1/1999 |
| WO | WO0149058 | 5/2001 |
| WO | 0158081 A1 | 8/2001 |
| WO | WO0163954 | 8/2001 |

OTHER PUBLICATIONS

Puetz, Secure Interoperation Between 2G and 3G Mobile Radio Networks, Mar. 2000, International Conferene on 3G Mobile Communication Technologies, No. 471, pp. 28-32.*

Wagner et al. "Cryptanalysis of the Cellular Message Encryption Algorithm," Advances in Cryptology, Santa Barbara, Aug. 17-21, 1997; Proceedings of the Annual International of Cryptology Conference (CRYPTO), Berlin, Springer, DE, vol. Conf. 17, Aug. 17, 1997, pp. 526-537.

International Search Report—PCT/US2002/035297, International Search Authority—European Patent Office, Apr. 8, 2003.

International Preliminary Examination Reoprt, PCT/US2002/035297—International Preliminary Examining Authority—US, Nov. 14, 2003.

3rd Generation Partnership, 3G TS 33.102, [Online] Jul. 1999, V3.1.0, pp. 18-30 [Searched on Apr. 10, 2009], Internet, URL:http//www.quintillion.co.jp/3GPP/Specs/33102-310.pdf.

* cited by examiner

METHOD AND APPARATUS FOR MESSAGE INTEGRITY IN A CDMA COMMUNICATION SYSTEM

FIELD

The present invention relates generally to the field of communications, and more particularly, to communications in a cellular communication system.

BACKGROUND

Code division multiple access (CDMA) communication systems are evolving from an early generation to a more advanced generation. In updating a system, one or more parameters associated with various operations of the system may change. The mobile stations in the more advanced system are also updated to operate within the new parameters. One of the early generation systems operates in accordance with the parameters defined in the TIA/EIA-95A/B standard, incorporated by reference herein. One of the more advanced systems operates in accordance with the, TIA/EIA-IS-2000-A standard, incorporated by reference herein. At the time of this application for a patent, a newer version of the TIA/EIA-IS-2000-A standard is under development and being released under TIA/EIA-IS-2000-B standard, incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America.

A communication system has many different components. The operating parameters of each component are defined by the corresponding standard. A system may be partially updated by changing certain components to operate in accordance with the newer version of the corresponding standard. One of the mandate and essential features of the proposed TIA/EIA-IS-2000-B standard is providing message integrity of the communication between a mobile station and a base station. Message integrity guarantees the legitimacy of the sender of the message. To achieve message integrity, an Authentication and Key Agreement (AKA) procedure has been developed and defined in the relevant sections of the standard. An Authentication Center (AC) is a component that manages the authentication information related to the mobile stations operating in the system. The operating parameters of an interface between a mobile switching center (MSC) and the AC need to be upgraded from an earlier version for performing the AKA procedure. Without an MSC-AC interface upgrade, the upgraded mobile stations and the base stations, which are capable of performing the AKA procedure, can not actually perform the AKA procedure due to the lack of the system to carry the AKA information via the MSC-AC interface. As a result, message integrity can not be performed. Such a condition becomes a significant deployment problem when the base stations and mobile stations are upgraded to operate in accordance with the proposed TIA/EIA-IS-2000-B standard prior to upgrading the MSC-AC interfaces.

To this end as well as others, there is a need for a method and apparatus to allow the more advanced generation mobile stations and base stations to perform message integrity.

SUMMARY

In a communication system, a method and apparatus provides for message integrity regardless of the operating version of an authentication center or an interface between the authentication center and a mobile switching center. The method and apparatus include generating a cellular message encryption algorithm (CMEA) key, and generating a CMEA-key-derived integrity key (CIK) based on the CMEA key for message integrity between a mobile station and a base station. The mobile station transmits a registration message to the base station, and determines an operating version of the authentication center in communication with the base station based on whether the mobile station receives a registration accepted order or an element of an authentication vector from the base station. The CIK is generated based on the CMEA key, if the mobile station receives a valid registration accepted order from the base station. The CIK is generated by repeating the CMEA key twice. The mobile station and the base station locally generate the CIK based on the CMEA key for, respectively, reverse and forward communications in the communication system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Figure 1:
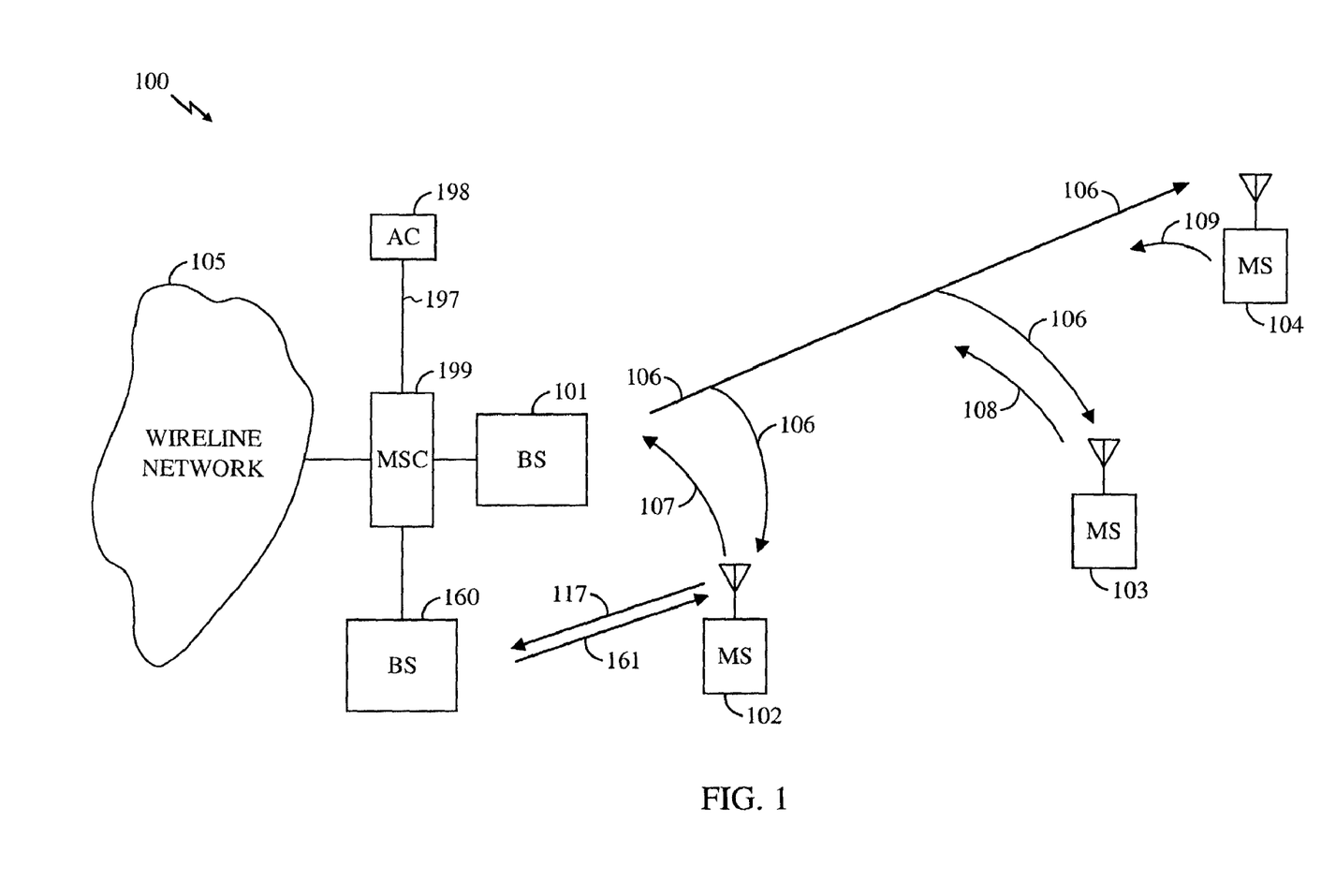
FIG. 1 illustrates a communication system capable of operating in accordance with various embodiments of the invention.

Various embodiments of the invention may be incorporated in a wireless communication system operating in accordance with the code division multiple access (CDMA) technique which has been disclosed and described in various standards published by the Telecommunication Industry Association (TIA) and other standards organizations. FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals and the base station as data access network without departing from the main scope and various advantages of the invention. Base station 101 may include a number of components, such as a base station controller and a base transceiver system. For simplicity, such components are not shown. Base station 101 may also be in communication with other base stations, for example base station 160. An MSC 199 coupled to base stations 101 and 160 may control various operating aspects of the communication system 100. An AC 198 may be in communication with the MSC 199 for performing the management of the authentication services provided in the system 100. An interface 197 between AC 198 and MSC 199 provides the communication medium for communications of relevant information relating to the authentication process.

Base station 101 communicates with each mobile station that is in its coverage area via a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the information that is targeted for its user. Base station 160 may also communicate with the mobile stations that are in its coverage area via a forward link signal. Mobile stations 102-104 communicate with base stations 101 and 160 via corresponding reverse links. Each reverse link is maintained by a reverse link signal, such as reverse link signals 107-109 for respectively mobile stations 102-104.

Figure 2:
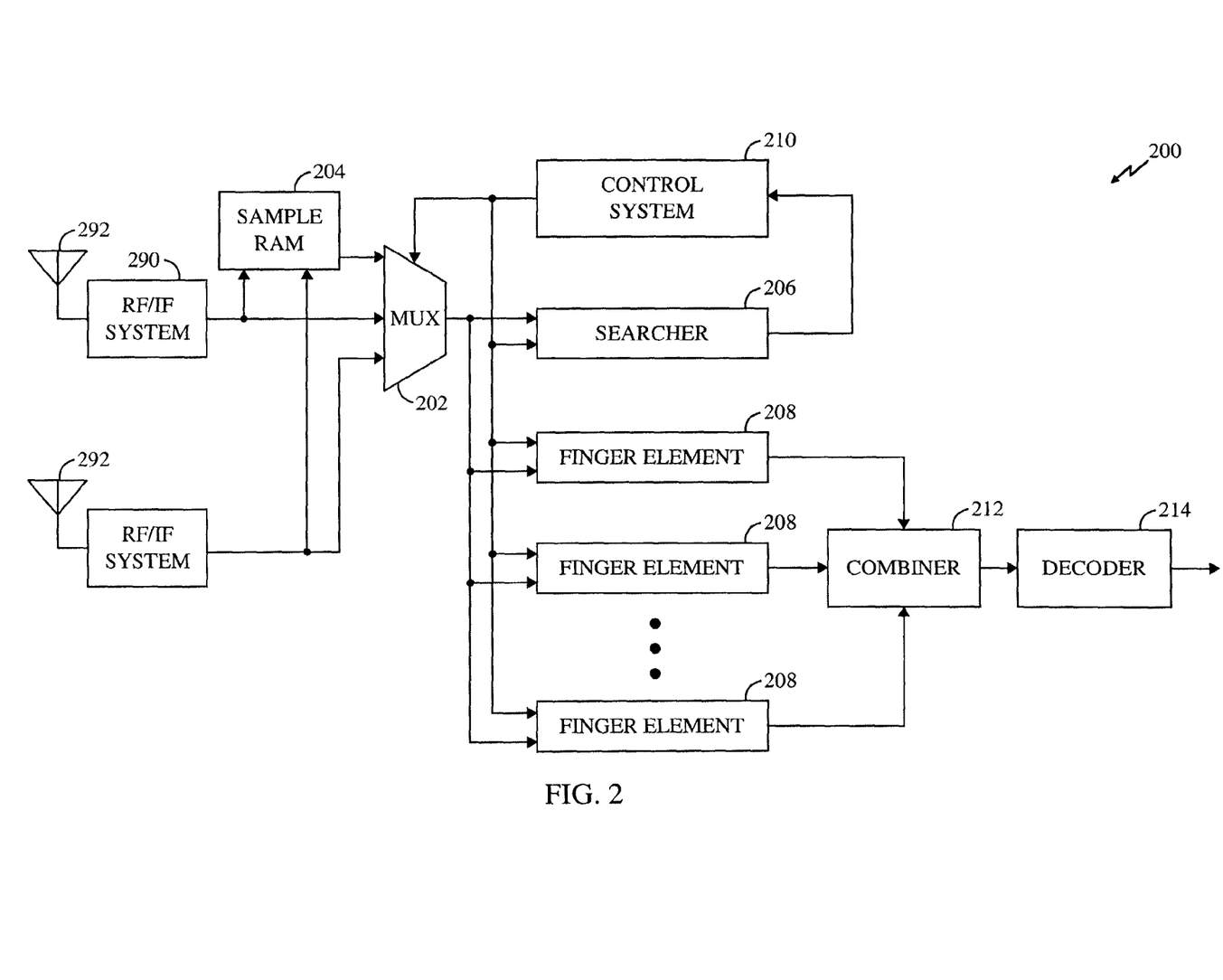
FIG. 2 illustrates a communication system receiver for receiving and decoding received data at a data rate in accordance with various aspects of the invention.

FIG. 2 illustrates a block diagram of a receiver 200 used for processing and demodulating the received CDMA signal. Receiver 200 may be used for decoding the information on the reverse and forward links signals. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for receiving diversity gain. Multiple received signals may be from a common source that has propagated through different propagation paths. Antenna system 292 receives the RF signals, and passes the RF signals to RF/IF system 290. RF/IF system 290 may be any conventional RF/IF receiver. The received RF signals are filtered, down-converted and digitized to form RX samples at base band frequencies. The samples are supplied to a demultiplexer (demux) 202. The output of demux 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with a turbo decoder or any other suitable algorithms.

During operation, receive samples are supplied to demux 202. Demux 202 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. The decoding process may include a process for de-encrypting the received data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art.

Figure 3:
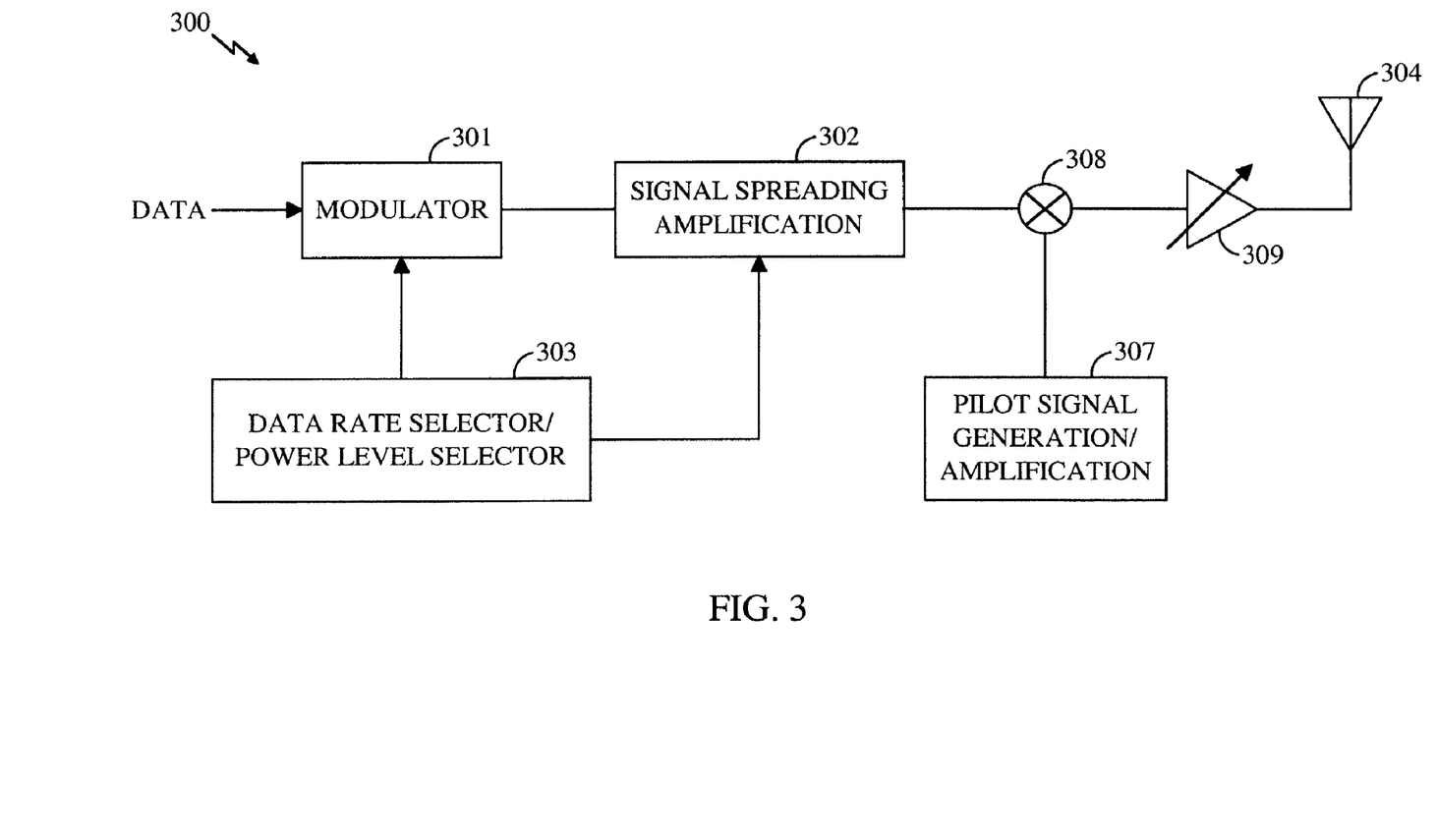
FIG. 3 illustrates a communication system transmitter for transmitting data packets at a scheduled data rate in accordance with various aspects of the invention.

FIG. 3 illustrates a block diagram of a transmitter 300 for transmitting the reverse and forward link signals. Traffic channel data for transmission are input to a modulator 301 for modulation. The modulation may be according to any of the commonly known modulation techniques such as QAM, PSK or BPSK. The data is encoded at a data rate in modulator 301. The input data to modulator 301 may include the data for performing message integrity. The data rate may be selected by a data rate and power level selector 303. For the reverse link signals, the data rate selection may be based on feedback information from a receiving base station. The data rate and power level selector 303 accordingly selects the data rate in modulator 301. The output of modulator 301 passes through a signal spreading operation and amplified in a block 302 for transmission from an antenna 304. A pilot signal is also generated in a block 307. The pilot signal is amplified to an appropriate level in block 307. The pilot signal power level may be in accordance with the channel condition at a receiving base station. The pilot signal is combined with the traffic channel signal in a combiner 308. The combined signal may be amplified in an amplifier 309 and transmitted from antenna 304. The antenna 304 may be in any number of combinations including antenna arrays and multiple input multiple output configurations. The data rate and power level selector 303 also selects a power level for the amplification level of the transmitted signal in accordance with the feedback information. The combination of the selected data rate and the power level allows proper decoding of the transmitted data at the receiving base station.

Mobile station 102 may roam from the coverage area of the base station 101 to the coverage area of the base station 160. The mobile station may go through a soft handoff process with the base stations 101 and 160. The handoff process is commonly known. The mobile station 102 continues the use of the communication services by receiving the forward link signal 161 from base station 160 and transmitting the reverse link signal 117. The AC 198 is used to authenticate and provide the encryption keys for a secure communication between a mobile station and any of the base stations 101 and 160.

Figure 4:
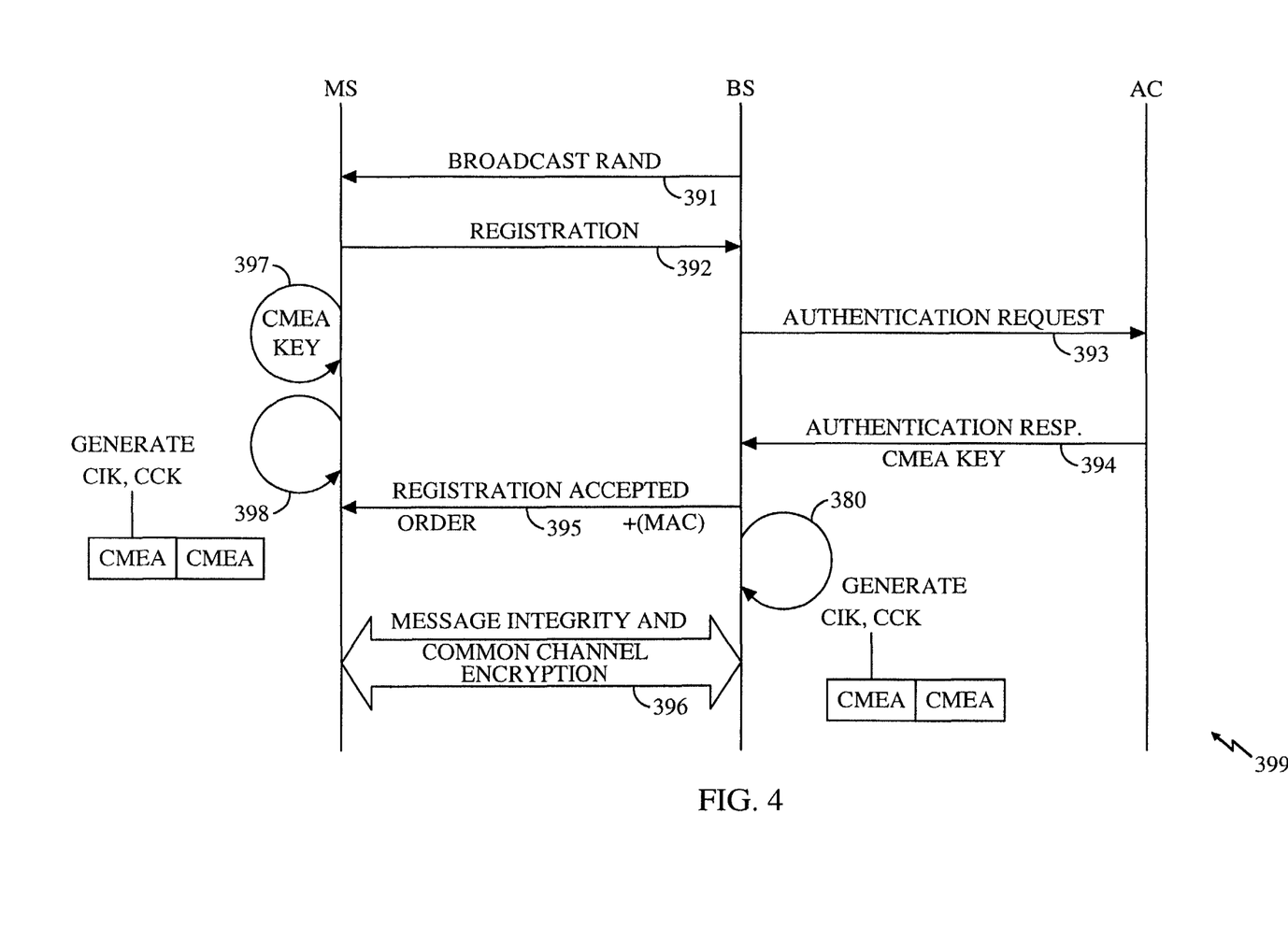
FIG. 4 illustrates the authentication and key set-up procedures in accordance with various aspects of the invention.

Referring to message flow 399 depicted in FIG. 4, a message flow for authentication and encryption is shown in accordance with various aspects of the invention. The base station and the mobile station involved in the message flow 399 are operating in accordance with the proposed TIA/EIA-IS-2000-B standard. The AC 198, in this case, has not been updated to operate in accordance with relevant section of the standards in the proposed TIA/EIA-IS-2000-B standard. The interface between AC 198 and MSC 199 has not been updated to operate in conformance of the ANSI-41 standard, incorporated by reference herein, relevant to the operations of message integrity and encryption as outlined in the TIA/EIA-IS-2000-B. The base station broadcasts a random access number (RAND) message 391 to all mobile stations. The mobile station uses RAND to generate a registration message 392. The base station communicates the authentication information carried by the registration message to AC 198 on an authentication request message 393, via the MSC-AC interface 197. The AC 198 internally compares the authentication information in the authentication request message to an expected value, confirms the authentication of the mobile station, and generates an authentication response message that carries the cellular message encryption algorithm key (CMEA key) 394. The generation of the CMEA key allows encrypted communications between the mobile station and the base station. At the mobile station, the same CMEA key is also generated by the internal message 397. The mobile station locally generates a CMEA-key-derived cipher key (CCK) by the internal message 398 based on the locally generated CMEA key. The CCK is used for encryption. The mobile station also, in accordance with an embodiment of the invention, generates a CMEA-key-derived integrity key (CIK) for performing message integrity with the base station. The CIK may be based on the CMEA key. The CMEA key is repeated twice to produce the CIK in accordance with an embodiment of the invention. The base station also locally generates CCK by the internal message 380. The base station also generates the same CIK based on the CMEA key for message integrity with the mobile station. The base station transmits a registration accepted order 395 to the mobile station based on the authentication response message 393. The registration accepted order 395 may include a message authentication code (MAC). The values for MAC may be based on the generated CIK at the base station. The generated CIK may be used as an input to a processor to generate the MAC in accordance with a predefined function. As such, the mobile station based on its own generated CIK can verify the legitimacy of the base station transmitting the registration accepted order 395. After this point, the common communications 396 between the mobile station and base station may be encrypted via CCK in accordance with a known encryption algorithm. Moreover, the common communications 396 between the base station and the mobile station may include message integrity check based on the CIK generated at the base station and mobile station. Therefore, message integrity feature is provided for the communications between the mobile station and the base station without requiring the AC 198 to operate differently other than the operations defined in the TIA/EIA-IS-2000A standards.

Figure 5:
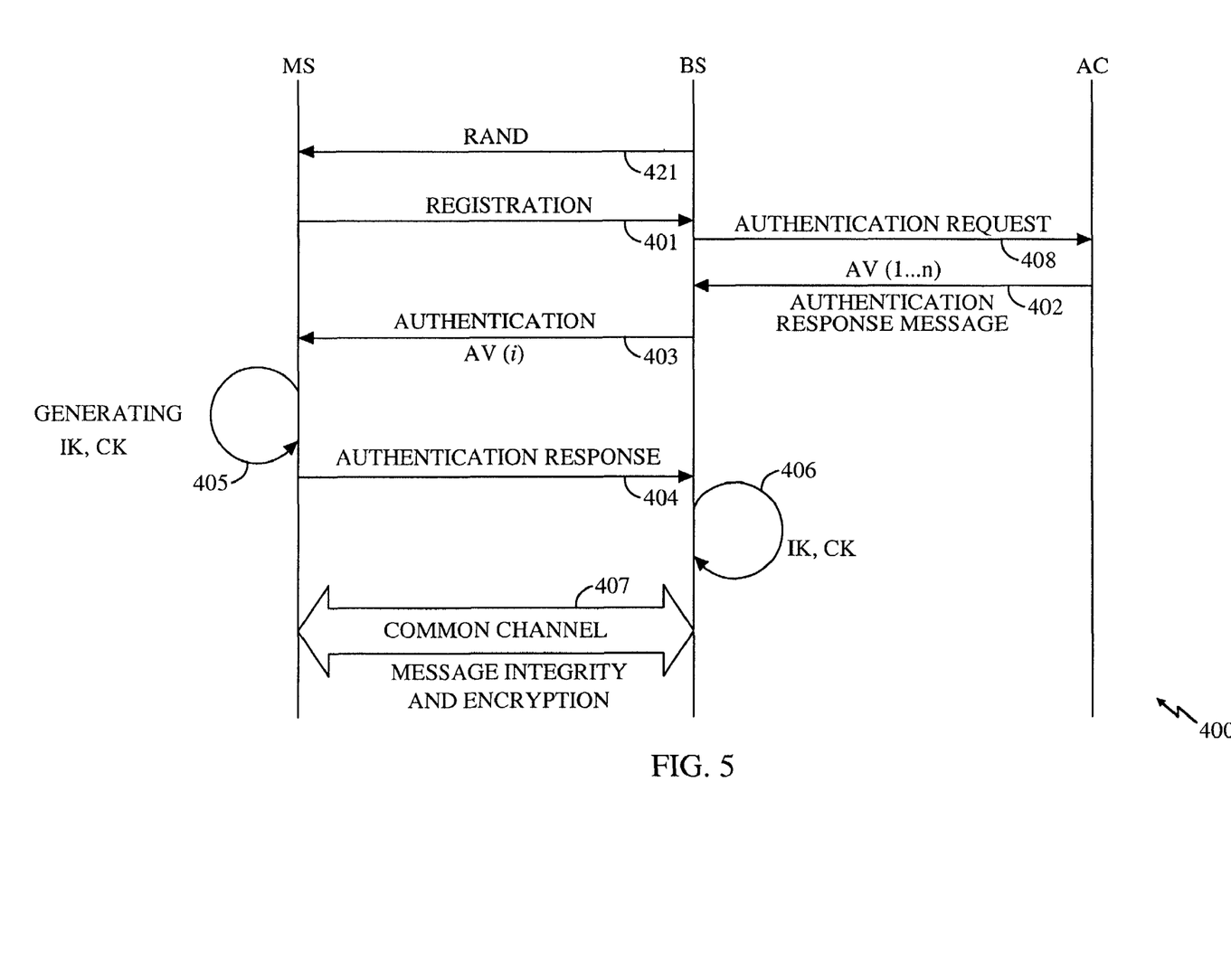
FIG. 5 illustrates the authentication and key set-up procedures in accordance with the TIA/EIA-IS-2000-B standard.

Referring to message flow 400 depicted in FIG. 5, a message flow for authentication and encryption is shown. The base station and the mobile station shown are operating in accordance with the proposed TIA/EIA-IS-2000-B standard. The AC 198 is operating in accordance with relevant standard defined in the TIA/EIA-IS-2000-B standard. The MSC-AC interface 197 is also updated based on relevant sections of the standard ANSI-41 to allow communications of the authentication parameters as defined by the TIA/EIA-IS-2000-B standard. The message flow 400 may be used between a mobile station, a base station and the AC 198. The base station broadcasts a random access number (RAND) message 421 to all mobile stations. The mobile station uses RAND to generate a registration message 401. The base station then sends an authentication request message 408 to the AC 198. The AC 198 then sends an authentication response message 402. The message 402 carries a set of authentication vectors (AV) in accordance with the TIA/EIA-IS-2000-B. Each AV contains a number of elements used for authentication including integrity key (IK) and cipher key (CK). The base station selects one of the authentication vectors and transmits some elements of the selected AV to the mobile station on an authentication request message 403. The elements of the AV are generated based on a root key that is kept at the AC 198. The same root key is also stored in the mobile station. The mobile station internally checks whether the communicated AV elements match the AV elements generated based on the stored root key. If the match is successful, the mobile station in effect has authenticated the base station. Based on the root key and the communicated AV elements, the mobile station locally generates IK and CK via an internal message 405. The mobile station also generates a user response (RES) based on the communicated AV elements. The mobile station then transmits the RES in an authentication response 404 to the base station. The base station also locally generates IK and CK via internal message 406. The base station compares the received RES to the expected RES. If a match exists, the base station in effect has authenticated the mobile station. At this point, the communications 407 may perform message integrity and encryption in accordance with the TIA/EIA-IS-2000-B standard.

Various aspects of the invention allows that the CMEA key result from the authentication process be used as the integrity key for performing message integrity. Since the mobile station could roam to systems with base stations operating in accordance with the proposed TIA/EIA/IS-2000-B standard but with different versions of AC 198 or MSC-AC interface 197, the mobile station has no way of knowing beforehand which versions of the AC 198 or MSC-AC interface 197 has been incorporated in the system. More specifically, if a mobile station and a base station operating in accordance with the proposed TIA/EIA-IS-2000-B standard are communicating in the communication system 100 while the AC 198 is operating in accordance with the TIA/EIA-IS-95-B or TIA/EIA-IS-2000-A and/or the MSC-AC interface 197 is operating in accordance with ANSI-41 relevant to the TIA/EIA-IS-95-B or TIA/EIA-IS-2000-A, the mobile station may deny any communication with the base station because of the lack of the message integrity feature. Therefore, the mobile station needs, without added complexity, a method and apparatus to distinguish which versions of AC 198 or MSC-AC interface 197 has been incorporated in the system.

Figure 6:
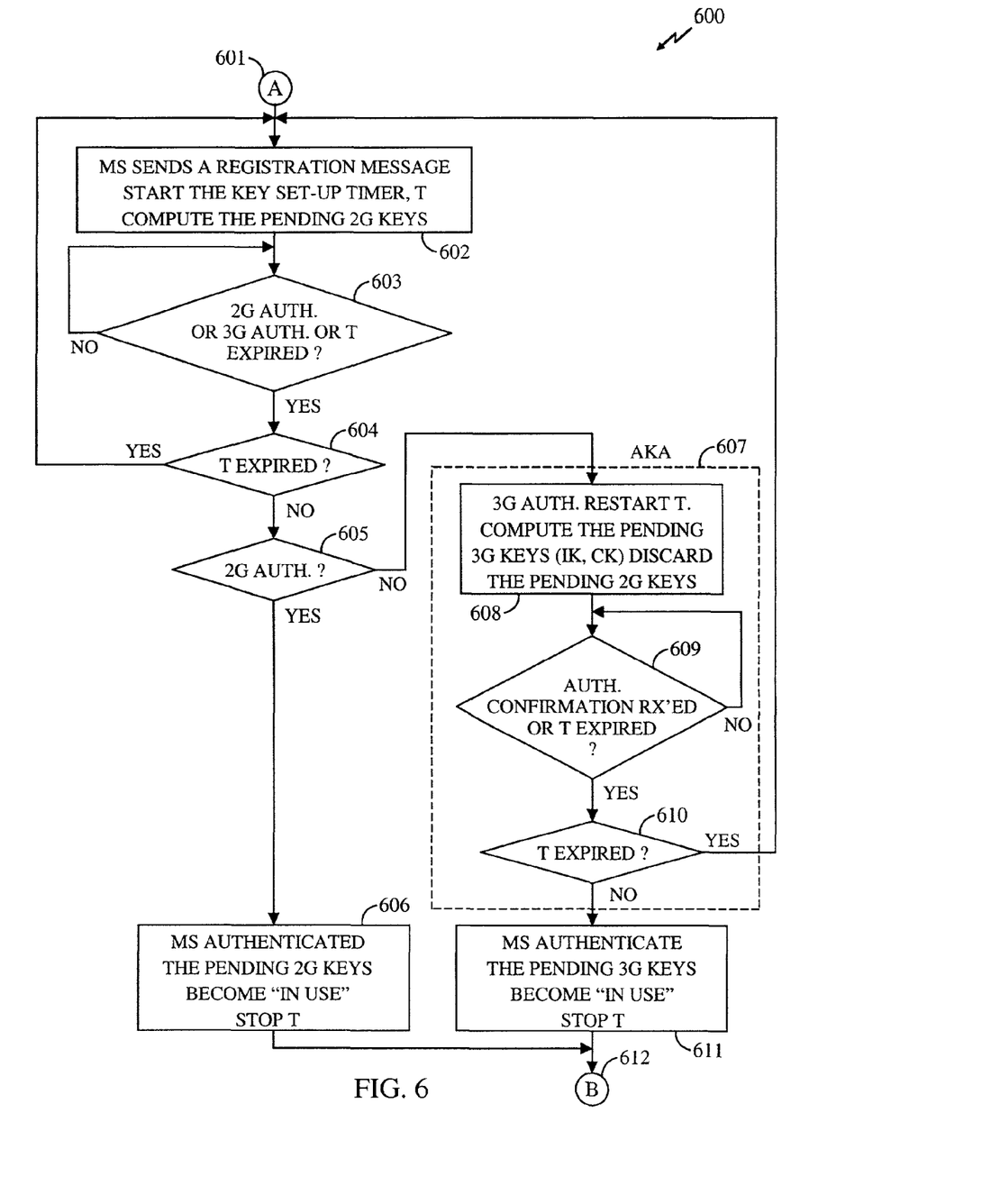
FIG. 6 illustrates a process flow for a mobile station to perform message integrity in a communication system in accordance with various aspects of the invention.

Referring to FIG. 6, a flow chart 600 depicts an algorithm which allows the mobile station to establish a message integrity key and perform authentication with a base station regardless of the version of AC 198 or MSC-AC interface 197. At step 601, the mobile station may or may not have been authenticated. At step 602, the mobile station, assuming the AC 198 is operating in accordance with the TIA/EIA-IS-95B or TIA/EIA-IS-2000-A, sends a registration message 392 to the base station and computes the CMEA key and generates CIK and CCK via internal messages 397 and 398. If the mobile station has been through a successful authentication process, the mobile station will already have an integrity key, either CIK or IK depending on the style of authentication. In that case, a message authentication code (MAC) of the registration message is included in the registration message. The presence of the MAC allows the base station to perform local authentication with the mobile station, which reduces authentication-related traffic in the network. The mobile station expects to receive a registration accepted order 395 from the base station. At step 603, the mobile station determines whether AC 198 or MSC-AC interface 197 is operating in accordance with the TIA/EIA-IS-95B and TIA/EIA-IS-2000-A or TIA/EIA-IS-2000-B. The authentication in accordance with the TIA/EIA-IS-95B and TIA/EIA-IS-2000-A may be referred to as the 2G authentication. The authentication in accordance with the TIA/EIA-IS-2000-B and may be referred to as the 3G authentication. A timer may be used to limit the amount of time the mobile station stays in such a mode. If the timer is expired at step 604, the process begins at step 602, unless the mobile station already has an integrity key, in which case the mobile station moves directly to step 606. If the mobile station receives the registration accepted order 395 from the base station, the AC 198 and MSC-AC interface 197 is operating in accordance with the 2G authentication procedure. The process at step 605 moves to the step 606. At step 606, the mobile station uses the generated CMEA key to derive CIK and CCK via internal messages 397 and 398 for performing message integrity and encryption for communication on the common channel with the base station. If the mobile station receives an authentication request message 403 from the base station, the AC 198 or MSC-AC interface 197 is operating in accordance with the 3G authentication procedure. As such, the process flow at step 605 moves to step 607 to discard the generated CMEA key and any pending CIK and CCK, and generate IK and CK. The process at step 607 may include one or more steps. At step 608, the IK and CK are generated via the internal message 405. At steps 609 and 610, the authentication is confirmed with the base station along with use of a timer for preventing the mobile station to remain in such a mode for a long time. At step 611, the mobile station has established the IK and CK for message integrity and encryption. At step 612, the mobile station holds a correct set of parameters for message integrity and encryption with the base station. The process may be repeated every time the mobile station is required to perform registration.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method in a mobile station comprising:
    transmitting a registration message to a base station, wherein the registration message is based on a 2G authentication procedure;
    starting a key setup timer;
    generating a cellular message encryption algorithm (CMEA) key for use in registration based on the 2G authentication procedure;
    restarting the method using a new registration message if the key setup timer expires;
    receiving a registration response from the base station;
    determining an operating version of an authentication center in communication with said base station based on the registration response; and
    when the operating version is determined to be based on a 3G authentication procedure, stopping the key setup timer and using an integrity key (IK), based on an element of an authentication vector received in the registration response, for message integrity between said mobile station and said base station.

2. A mobile station for a communication system, comprising:
    means for transmitting a registration message to a base station, wherein the registration message is based on a 2G authentication procedure;
    means for starting a key setup timer;
    means for generating a cellular message encryption algorithm (CMEA) key for use in registration based on the 2G authentication procedure;
    means for restarting the registration using a new registration message if the key setup timer expires;
    means for receiving a registration response from the base station;
    means for determining an operating version of an authentication center in communication with said base station based on the registration response; and
    means for stopping the key setup timer and using an integrity key (IK), based on an element of an authentication vector received in the registration response, for message integrity between said mobile station and said base station when the operating version is determined to be based on a 3G authentication procedure.

3. A processor product, comprising:
    processor readable medium including:
        instructions for causing a processor to transmit a registration message to a base station, wherein the registration message is based on a 2G authentication procedure;
        instructions for causing a processor to start a key setup timer;
        instructions for causing a processor to generate a cellular message encryption algorithm (CMEA) key for use in registration based on the 2G authentication procedure;
        instructions for causing a processor to restart the registration using a new registration message if the key setup timer expires;
        instructions for causing a processor to receive a registration response from the base station;
        instructions for causing a processor to determine an operating version of an authentication center in communication with said base station based on the registration response; and instructions for causing a processor to stop the key setup timer and to use an integrity key (IK), based on an element of an authentication vector received in the registration response, for message integrity between said mobile station and said base station when the operating version is determined to be based on a 3G authentication procedure.

4. The method as recited in claim 1, further comprising:
when the operating version is determined to be based on the 2G authentication procedure, generating a CMEA-key-derived integrity key (CIK) based on said CMEA key for message integrity between said mobile station and said base station.

5. The mobile station as recited in claim 2, further comprising:
means for generating a CMEA-key-derived integrity key (CIK) based on said CMEA key for message integrity between said mobile station and said base station when the operating version is determined to be based, on the 2G authentication procedure.

6. The processor product as recited in claim 3, further comprising
instructions for causing a processor to generate a CMEA-key-derived integrity key (CIK) based on said CMEA key for message integrity between said mobile station and said base station when the operating version is determined to be based on the 2G authentication procedure.

7. The method as recited in claim 4, wherein said generating said CIK includes repeating said CMEA key twice to generate said CIK.

8. The mobile station as recited in claim 5, wherein said CMEA key is repeated twice to generate said CIK.

9. The processor product as recited in claim 6, wherein said CMEA key is repeated twice to generate said CIK.

10. The method as recited in claim 1, wherein the step of determining an operating version determines that the authentication center is operating in accordance with the 2G authentication procedure when the mobile station receives a registration accepted order as the registration response.

11. The method as recited in claim 1, wherein the step of determining an operating version determines that the authentication center is operating in accordance with the 3G authentication procedure when the mobile station receives, as the registration response, an authentication request message having elements of an authentication vector from the base station.

12. The mobile station as recited in claim 2, wherein the means for determining an operating version determines that the authentication center is operating in accordance with the 2G authentication procedure when the mobile station receives a registration accepted order as the registration response.

13. The mobile station as recited in claim 2, wherein the means for determining an operating version determines that the authentication center is operating in accordance with the 3G authentication procedure when the mobile station receives, as the registration response, an authentication request message having elements of an authentication vector from the base station.

14. The processor product as recited in claim 3, wherein the instructions for causing a processor to determine an operating version cause the processor to determine that the authentication center is operating in accordance with the 2G authentication procedure when the mobile station receives a registration accepted order as the registration response.

15. The processor product as recited in claim 3, wherein the instructions for causing a processor to determine an operating version cause the processor to determine that the authentication center is operating in accordance with the 3G authentication procedure when the mobile station receives, as the registration response, an authentication request message having elements of an authentication vector from the base station.

16. A processor configured to implement a method, the method comprising:
transmitting a registration message to a base station, wherein the registration message is based on a 2G authentication procedure;
starting a key setup timer;
generating a cellular message encryption algorithm (CMEA) key for use in registration based on the 2G authentication procedure;
restarting the method using a new registration message if the key setup timer expires;
receiving a registration response from the base station;
determining an operating version of an authentication center in communication with said base station based on the registration response; and
when the operating version is determined to be based on a 3G authentication procedure, stopping the key setup timer and using an integrity key (IK), based on an element of an authentication vector received in the registration response, for message integrity between said mobile station and said base station.

17. The processor as recited in claim 16, wherein the method further comprises:
when the operating version is determined to be based on the 2G authentication procedure, generating a CMEA-key-derived integrity key (CIK) based on said CMEA key for message integrity between said mobile station and said base station.

18. The processor as recited in claim 17, wherein said generating said CIK includes repeating said CMEA key twice to generate said CIK.

19. The processor as recited in claim 16, wherein the step of determining an operating version determines that the authentication center is operating in accordance with the 2G authentication procedure when the mobile station receives a registration accepted order as the registration response.

20. The processor as recited in claim 16, wherein the step of determining an operating version determines that the authentication center is operating in accordance with the 3G authentication procedure when the mobile station receives, as the registration response, an authentication request message having elements of an authentication vector from the base station.

* * * * *